US012676526B2

(12) United States Patent
Rudolph et al.

(10) Patent No.: US 12,676,526 B2
(45) Date of Patent: Jul. 7, 2026

(54) ADDITIVELY MANUFACTURED AIR GAP WINDING FOR AN ELECTRICAL MACHINE

(71) Applicant: Maxon International AG, Sachseln (CH)

(72) Inventors: Johannes Rudolph, Bad Lausick (DE); Fabian Lorenz, Chemnitz (DE); Ralf Werner, Chemnitz (DE); Max Erick Busse-Grawitz, Alpnach Dorf (CH)

(73) Assignee: maxon international ag, Sachsein (CH)

( * ) Notice: Subject to any disclaimer, the term of this patent is extended or adjusted under 35 U.S.C. 154(b) by 330 days.

(21) Appl. No.: 18/285,577

(22) PCT Filed: Mar. 28, 2022

(86) PCT No.: PCT/EP2022/058070
§ 371 (c)(1),
(2) Date: Oct. 4, 2023

(87) PCT Pub. No.: WO2022/214344
PCT Pub. Date: Oct. 13, 2022

(65) Prior Publication Data
US 2024/0186858 A1     Jun. 6, 2024

(30) Foreign Application Priority Data

Apr. 7, 2021     (EP) ..................................... 21167202

(51) Int. Cl.
*H02K 3/47*          (2006.01)
*B33Y 80/00*        (2015.01)
*H02K 3/50*          (2006.01)

(52) U.S. Cl.
CPC ................ *H02K 3/47* (2013.01); *B33Y 80/00* (2014.12); *H02K 3/50* (2013.01)

(58) Field of Classification Search
CPC .. H02K 3/47; H02K 3/50; H02K 3/04; H02K 3/26; B33Y 80/00
(Continued)

(56) References Cited

U.S. PATENT DOCUMENTS

2014/0077648 A1     3/2014   Brauer et al.
2014/0339949 A1*   11/2014   Keller ...................... H02K 3/04
                                                                              29/596
2022/0060077 A1*     2/2022   Buol ................... H02K 15/085

FOREIGN PATENT DOCUMENTS

CH            715403 A2     3/2020
DE     102018131965 A1     6/2020
(Continued)

OTHER PUBLICATIONS

Wu Fan et al: "Towards Fully Additively-Manufactured Permanent Magnet Synchronous Machines: Opportunities and Challenges", A 2019 IEEE International Electric Machines & Drives Conference (IEMDC), IEEE, May 12, 2019 (May 12, 2019), Seiten 2225-2232, XP033588588, DOI: 10.1109/IEMDC.2019.8785210 Seite 2228-Seite 2229; Abbildung 4.

*Primary Examiner* — Ahmed Elnakib
(74) *Attorney, Agent, or Firm* — Dickinson Wright PLLC

(57) ABSTRACT

An additively manufactured air gap winding for an electrical machine is provided. The air-gap winding includes a hollow cylindrical main portion having a geometric axis, the main portion defining an active winding length of the winding, and electrical winding conductors of the winding extending in the main portion from a first axial end of the winding to a second axial end. The air gap winding further comprises a first winding head at the first axial end and a second winding head at the second axial end, wherein winding head connections of the winding conductors extend in the winding heads. The winding heads project radially inwardly and/or outwardly beyond the hollow cylindrical main section. The
(Continued)

winding head connections extend at least in sections at different distances from the axis in such a way that one winding head connection at least partially radially surrounds the other winding head connection.

15 Claims, 16 Drawing Sheets

(58) Field of Classification Search
USPC ......................................................... 310/208
See application file for complete search history.

(56) References Cited

FOREIGN PATENT DOCUMENTS

| | | | |
|---|---|---|---|
| EP | 2437379 | A2 | 4/2012 |
| EP | 2804293 | A1 | 11/2014 |
| EP | 3364529 | A1 | 8/2018 |
| JP | 2010041753 | A | 2/2010 |
| JP | 6827599 | B1 | 2/2021 |
| JP | 2021016300 | A2 | 2/2021 |
| WO | 2010007950 | A1 | 1/2012 |

* cited by examiner

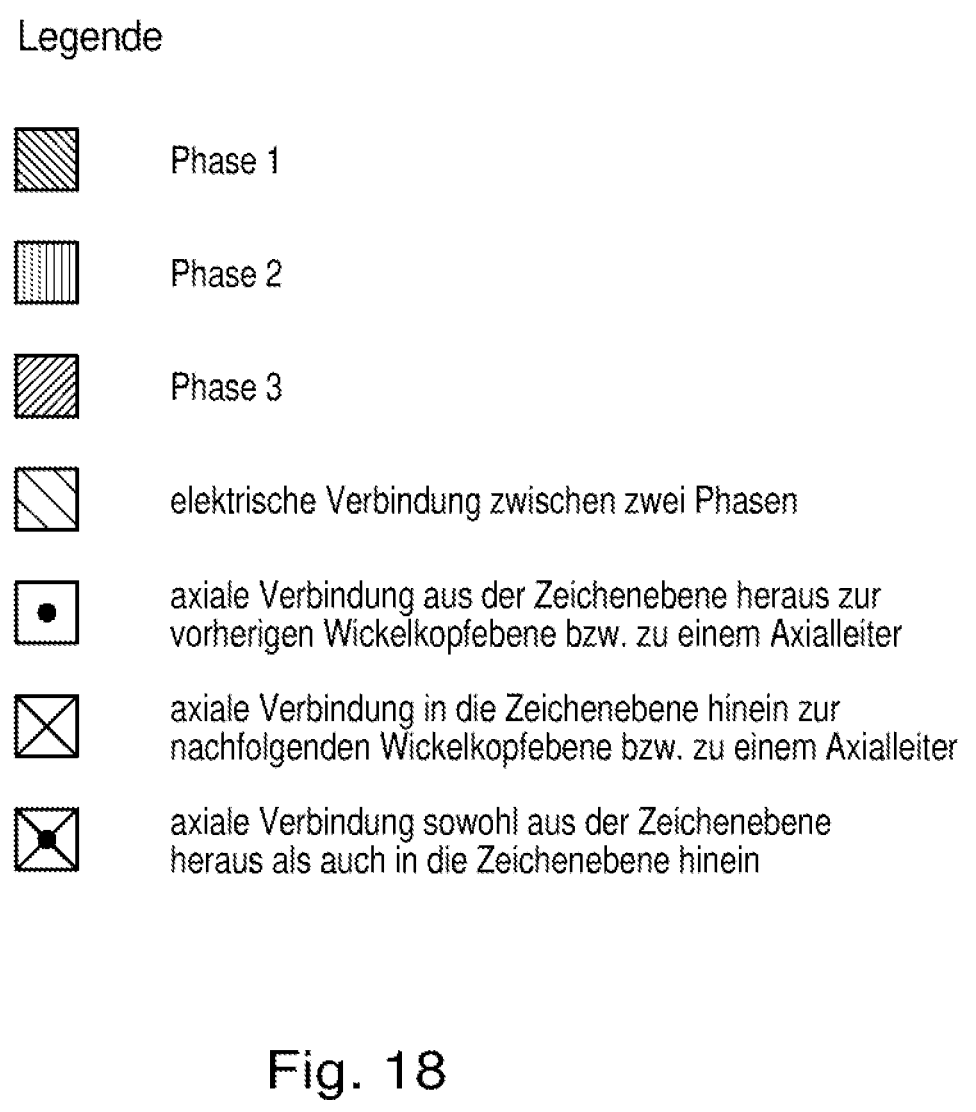

Legende

Phase 1

Phase 2

Phase 3 elektrische Verbindung zwischen zwei Phasen axiale Verbindung aus der Zeichenebene heraus zur
vorherigen Wickelkopfebene bzw. zu einem Axialleiter axiale Verbindung in die Zeichenebene hinein zur
nachfolgenden Wickelkopfebene bzw. zu einem Axialleiter axiale Verbindung sowohl aus der Zeichenebene
heraus als auch in die Zeichenebene hinein

Fig. 18

ADDITIVELY MANUFACTURED AIR GAP WINDING FOR AN ELECTRICAL MACHINE

CROSS-REFERENCE TO RELATED APPLICATION

This application claims priority to and the benefit of PCT Patent Application No. PCT/EP2022/058070 filed on 28 Mar. 2022, entitled "ADDITIVELY MANUFACTURED AIRGAP WINDING FOR AN ELECTRICAL MACHINE," and European Patent Application No. 21167202.7, filed on Apr. 7, 2021, entitled "ADDITIVELY MANUFACTURED AIR-GAP WINDING FOR AN ELECTRICAL MACHINE".

BACKGROUND

1. Field

The present disclosure relates to an additively manufactured air gap winding for an electrical machine.

2. Related Art

A generic air gap winding comprises a hollow cylindrical main section having a geometric axis, the main section defining an active winding length of the air gap winding, and electrical winding conductors of the air gap winding extending in the main section from a first axial end of the air gap winding to a second axial end of the air gap winding. The generic air gap winding further comprises a first winding head at the first axial end of the air gap winding and a second winding head at the second axial end of the air gap winding, wherein winding head connections of the winding conductors extend in the winding heads.

Electrical machines with air gap winding are known from the prior art. Their special feature compared to other machines is that they do not have distinctive poles for guiding the magnetic flux. The winding, which is usually three-phase, is hollow-cylindrical and is usually bounded on the outside by the stator or by a likewise cylindrical magnetic return path. The rotor is located inside. Alternatively, the air gap winding forms the rotor, especially in brush-commutated DC motors.

Conductor sections of the winding conductors running parallel to the axis mainly contribute to the formation of the torque. To form a complete conductor loop, conductor sections must be provided that are not parallel to the axis. This section of the winding is called the winding head and generates mainly ohmic losses, while the contribution to torque formation is small. The sections of the winding conductors running in the winding head are referred to below as winding head connections. In conventionally wound air gap windings, for example, two opposing coils are required for magnetic field generation for each phase. These are usually designed as shaped coils, with the coil wire being wound circularly in one plane by special winding machines. Due to the manufacturing technology, only in-plane coil wire runs that recur in a specific pattern are possible. In order to increase the power density or the efficiency of electrical machines with air gap winding, an optimum winding head geometry with at the same time the most favorable ratio possible between the active length of the winding and the winding head is the subject of current developments and research.

From EP 2437379 A2 and EP 2804293 A1, wound air gap windings are known in which the winding heads protrude inward or outward in the radial direction. This improves the ratio between active winding length and winding head length. The windings are usually wound from a copper wire or copper stranded wire. The procedures for producing a coil with this geometry are very complex and require several process steps. First, the coils are wound, with subsequent mechanical forming to create the radially protruding winding heads. In this process, there is a risk of damaging the insulation of the conductor wires, which can lead to short circuits and failures when used in an electrical machine.

From CH 715403 A2 a hollow cylindrical winding is known, which can be produced in a 3D printing process and has rectangular conductor cross sections. The ratio between active winding length and axial winding head length is unfavorable in this winding.

SUMMARY

The present disclosure has set itself the task of specifying a compactly constructed air gap winding with which a high power density or a high efficiency of the electrical machine can be achieved, whereby the air-gap winding must be able to ensure fail-safe operation of the electrical machine.

The task is solved by the features of independent claim 1. Accordingly, in the case of a generic air gap winding according to the preamble of independent claim 1, a solution of the task according to the disclosure is present if the winding heads project radially inwards and/or outwards beyond the hollow cylindrical main section, at least two of the winding head connections running at least in sections at different distances from the axis in such a way that one winding head connection radially surrounds the other winding head connection at least in sections. Preferably, this applies to several pairs of winding head connections.

Advantageous embodiments of the present disclosure are the subject of the dependent claims.

According to a preferred embodiment of the present disclosure, it is provided that the radially surrounding winding head connections run along circular curves with different radii. In this way, a particularly compact design can be achieved. It is of particular advantage in this respect if the center of the circular curves lies on the axis of the hollow cylindrical main section of the air gap winding according to the disclosure. Preferably, the winding head connections may extend along circular curves having at least three different radii. In other words, in this embodiment, there are preferably at least three radial planes on which the winding head connections can run.

According to a particularly preferred embodiment of the present disclosure, it is thereby provided that the winding head connections in the first winding head run along circular curves whose radius is greater than or substantially equal to the mean radius of the hollow cylindrical main section, wherein the winding head connections in the second winding head run along circular curves whose radius is smaller than or substantially equal to the mean radius of the hollow cylindrical main section. In this context, the indication "substantially equal" means that the winding head connection in question extends within the notionally extended inner and outer circumferential surfaces of the hollow cylindrical main section.

According to a further preferred embodiment of the present disclosure, it is provided that at least some of the winding head connections in the first and/or second winding head extend in different planes which are axially spaced from each other. This embodiment also contributes to a compact design. A single winding head connection connects in each case two winding conductor sections running in the main section and can thereby run either in a single plane or in sections in different planes.

Particularly preferably, the different planes are aligned perpendicular to the axis, which simplifies the structure, and a particularly compact design is achieved.

According to a further preferred embodiment of the present disclosure, it is provided that the air gap winding has at least two phases, the winding head connections of one phase being axially or radially offset from the winding head connections of another phase.

It has been found to be particularly advantageous if there is an axial offset between the winding head connections of different phases at the second winding head, the second winding head projecting radially inwardly beyond the hollow cylindrical main section.

In another particularly advantageous embodiment, there is an axial offset between the winding head connections of different phases at the first winding head, with the first winding head projecting radially outward beyond the hollow cylindrical main section.

According to another particularly preferred embodiment of the present disclosure, it is provided that the effective total length of all winding head connections of a single phase of the air gap development is substantially the same for all phases of the air gap development.

The effective total length determines the ohmic resistance and depends not only on the sum of all winding head connection lengths, but also on the conductor cross-sectional area. Preferably, this can vary among the individual winding head connections or even along a single winding head connection to achieve uniform ohmic resistance of all phases or to reduce ohmic resistance in general. "Substantially equal" in this context means that the resulting ohmic resistance of each phase differs by at most 5%, preferably by at most 2%, from the ohmic resistance of that phase with the lowest ohmic resistance.

It is particularly advantageous if that phase of the air gap winding which has the longest winding head connections at the first winding head simultaneously has the shortest winding head connections at the second winding head, wherein that phase of the air gap winding which has the shortest winding head connections at the first winding head simultaneously has the longest winding head connections at the second winding head.

According to another particularly preferred embodiment of the present disclosure, it is provided that the winding conductors in the main section run parallel to the axis of the air gap winding. In this way, a high degree of efficiency is achieved. In this case, the sections of the winding conductors extending in the main section between the winding heads may be referred to as axial conductors. Preferably, all winding conductors in the main section have the same distance to the axis.

According to a further particularly preferred embodiment of the present disclosure, it is provided that the sections of the winding conductors running in the main section between the winding heads each have a cross-section which is in the form of a circular ring sector, the outer and inner circular ring arcs of the circular ring sector preferably each running around a center point on the axis. This embodiment also helps to optimize the compact design or the efficiency.

According to another preferred embodiment of the present disclosure, the winding conductors are made of one or more electrically conductive materials. In this regard, the additive manufacturing provided according to the disclosure requires the use of a paste with metallic and/or electrically conductive particles. The paste is applied layer by layer using a fine nozzle. The structures thus created are then solidified in a sintering process in which the binders of the paste are removed and the particles fuse together. The winding conductors can be made of an electrically conductive or metallic material such as copper, aluminum, gold, silver or a metal alloy such as a copper alloy, an aluminum alloy or another 3D printable electrically conductive material such as conductive plastics or nanotubes. The winding conductors may also be made of multiple electrically conductive materials. For example, the winding conductors can consist of different materials in sections, or a winding conductor can contain an electrically conductive material in the core which is surrounded by another electrically conductive material. Thus, for example, the electrical conductance, mechanical strength, thermal expansion coefficients or temperature resistance of the conductor material can be adapted to the requirements at different positions in the winding conductor. For example, in certain areas of the main section or the winding heads, the mechanical stresses due to vibrations may be higher, which makes it preferable to use a material that has good mechanical properties. In other places, thermal properties of the conductor material are the main concern. At still other points, attention must be paid to low electrical resistance. Thus, an optimized conductor material can be produced for each area of the winding conductor.

According to a further preferred embodiment of the present disclosure, the winding conductors are surrounded by an insulation, consisting of one or more insulation materials, or embedded in the insulation. As insulation material, for example, ceramic can be used. The ceramic insulation thus forms a matrix in which the winding conductors of the printed air-gap winding are embedded. A similar paste with ceramic particles is used to produce the insulation in the additive manufacturing process. On the one hand, the ceramic insulation matrix prevents the conductors from touching and thus forming short circuits. Compared to conventional insulation systems, the ceramic insulation has a higher temperature resistance. At the same time, it ensures higher thermal conductivity, which leads to improved heat dissipation capacity and thus better conductor cooling. As a result, power density can be increased. The ceramic insulation matrix also assumes a support function for the electrical conductors embedded in it, protecting them from electromagnetically induced and mechanically caused vibrations that can lead to fatigue failures. The winding conductors can also be embedded in an insulation made of another insulation material such as resin or plastic. A paste containing said insulation particles can also be used to produce the insulation using an additive manufacturing process. The winding conductors can also be surrounded or embedded with one or more insulation materials. It is also possible that different winding conductors are embedded in different insulation materials or that a winding conductor is embedded in sections in different insulation materials. Certain insulation materials have, for example, a high electrical insulation value. Other materials have good thermal or mechanical properties. As described for the conductor material, the requirements for the insulation material can also vary greatly depending on the position on the winding conductor. By using different insulation materials, an optimum insulation material can be used for each area of the winding conductor. Furthermore, it is also possible to insulate the winding conductor from the inside to the outside with different insulation materials.

The air gap winding according to the disclosure prefer- ably has a diameter of less than 60 mm and is intended for use in small or miniature motors.

Examples of embodiments of the present disclosure are explained below with reference to drawings.

BRIEF DESCRIPTION OF DRAWINGS

It shows.

DESCRIPTION OF EMBODIMENTS

In the following explanations, the same parts are desig- nated by the same reference signs. If a figure contains reference signs which are not dealt with in detail in the associated figure description, reference is made to preceding or subsequent figure descriptions.

Figure 1:
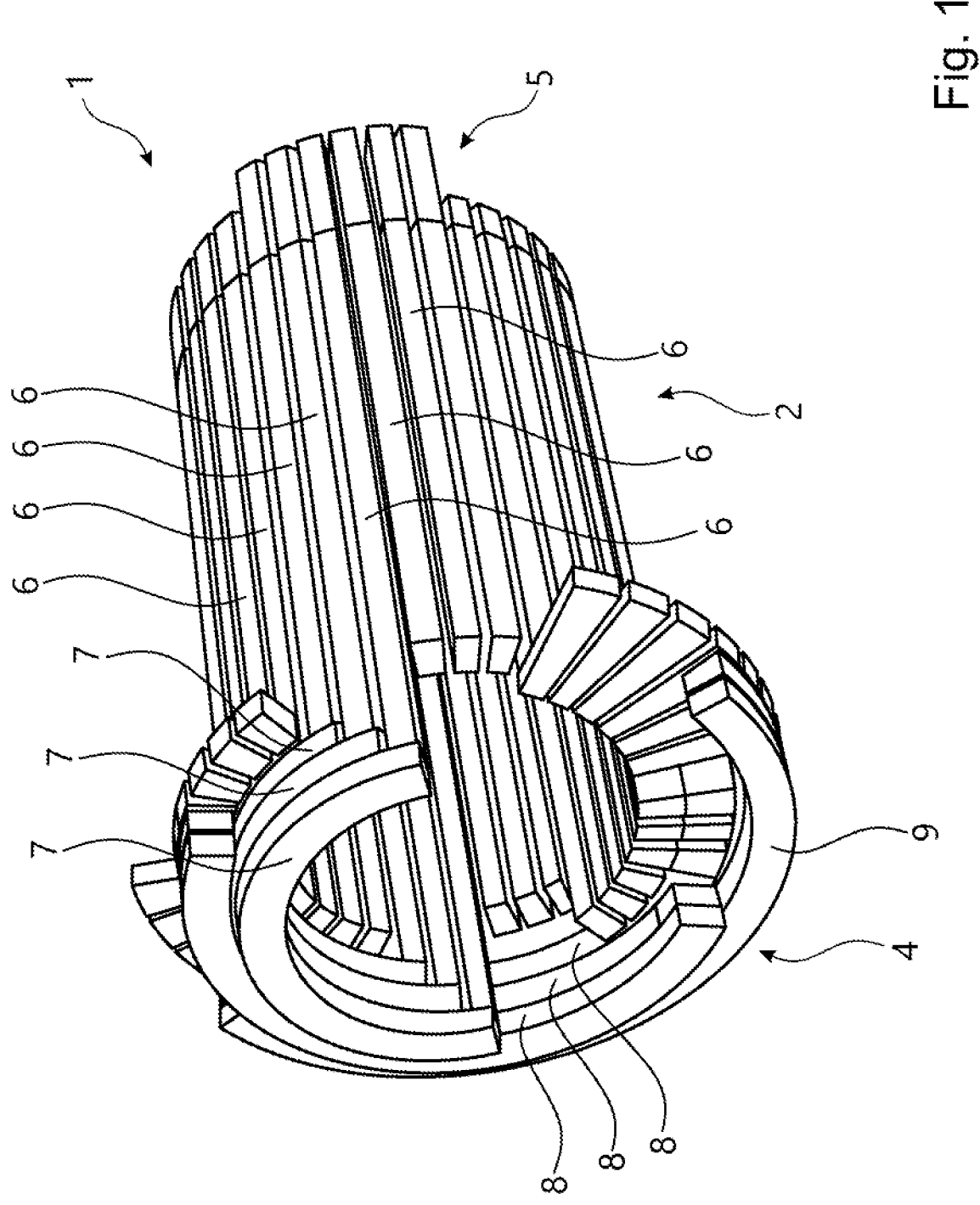
FIG. 1 a schematic perspective view of an air gap winding according to the disclosure in accordance with a first embodiment.
Figure 2:
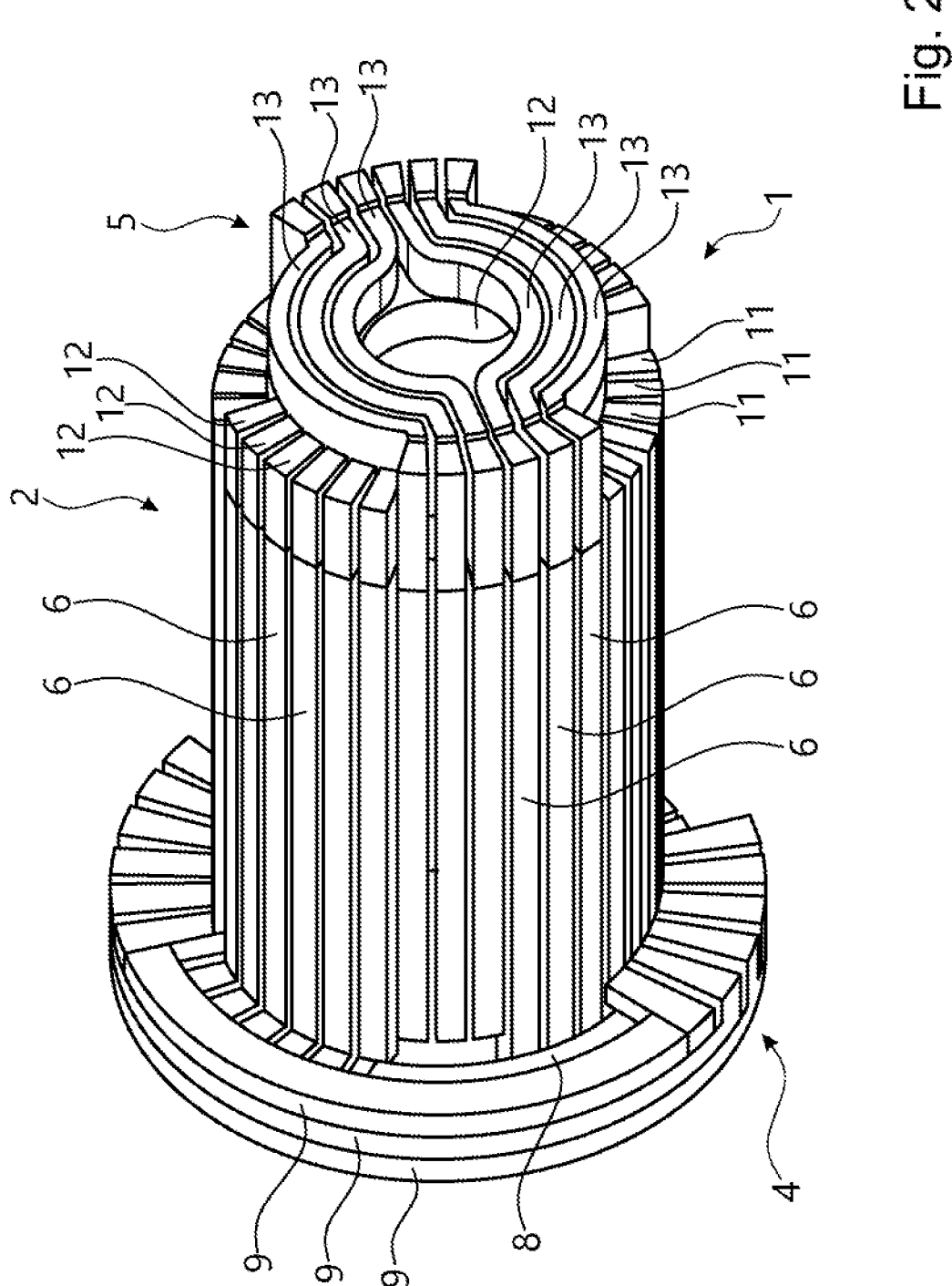
FIG. 2 shows the air gap winding according to the disclosure from FIG. 1 in a further schematic perspective view, FIG. 3 the air gap winding according to the disclosure from FIGS. 1 and 2 in a side view, FIG. 4 a side view of an air gap winding according to the disclosure in accordance with a second embodiment, FIG. 5 a longitudinal section through the air gap winding according to the disclosure from FIG. 4, FIG. 6 a detailed perspective view of the first winding head of the air gap winding according to the disclosure from FIGS. 4 and 5, FIG. 7 a top view of the first winding head of the air gap winding according to the disclosure from FIGS. 4 to 6, FIG. 8 a detailed perspective view of the second winding head of the air gap winding according to the disclosure from FIGS. 4 to 7, FIG. 9 a top view of the second winding head of the air gap winding according to the disclosure from FIGS. 4 to 8, FIG. 10 a cross-section through the air gap winding according to the disclosure from FIG. 4 in plane 1 (A) of the first winding head, FIG. 11 a cross-section through the air gap winding according to the disclosure from FIG. 4 in plane 2 (B) of the first winding head, FIG. 12 a cross-section through the air gap winding according to the disclosure from FIG. 4 in plane 3 (C) of the first winding head, FIG. 13 a cross-section through the air gap winding according to the disclosure from FIG. 4. in plane 4 (D) of the first winding head, FIG. 14 a cross-section through the air gap winding according to the disclosure from FIG. 4. in plane 5 (E) of the first winding head, FIG. 15 a cross-section through the air gap winding according to the disclosure from FIG. 4 in plane 1 (F) of the second winding head, FIG. 16 a cross-section through the air gap winding according to the disclosure from FIG. 4 in plane 2 (G) of the second winding head, FIG. 17 a cross-section through the air gap winding according to the disclosure from FIG. 4 in plane 3 (H) of the second winding head, FIG. 18 a legend to FIGS. 10 to 17.
Figure 3:
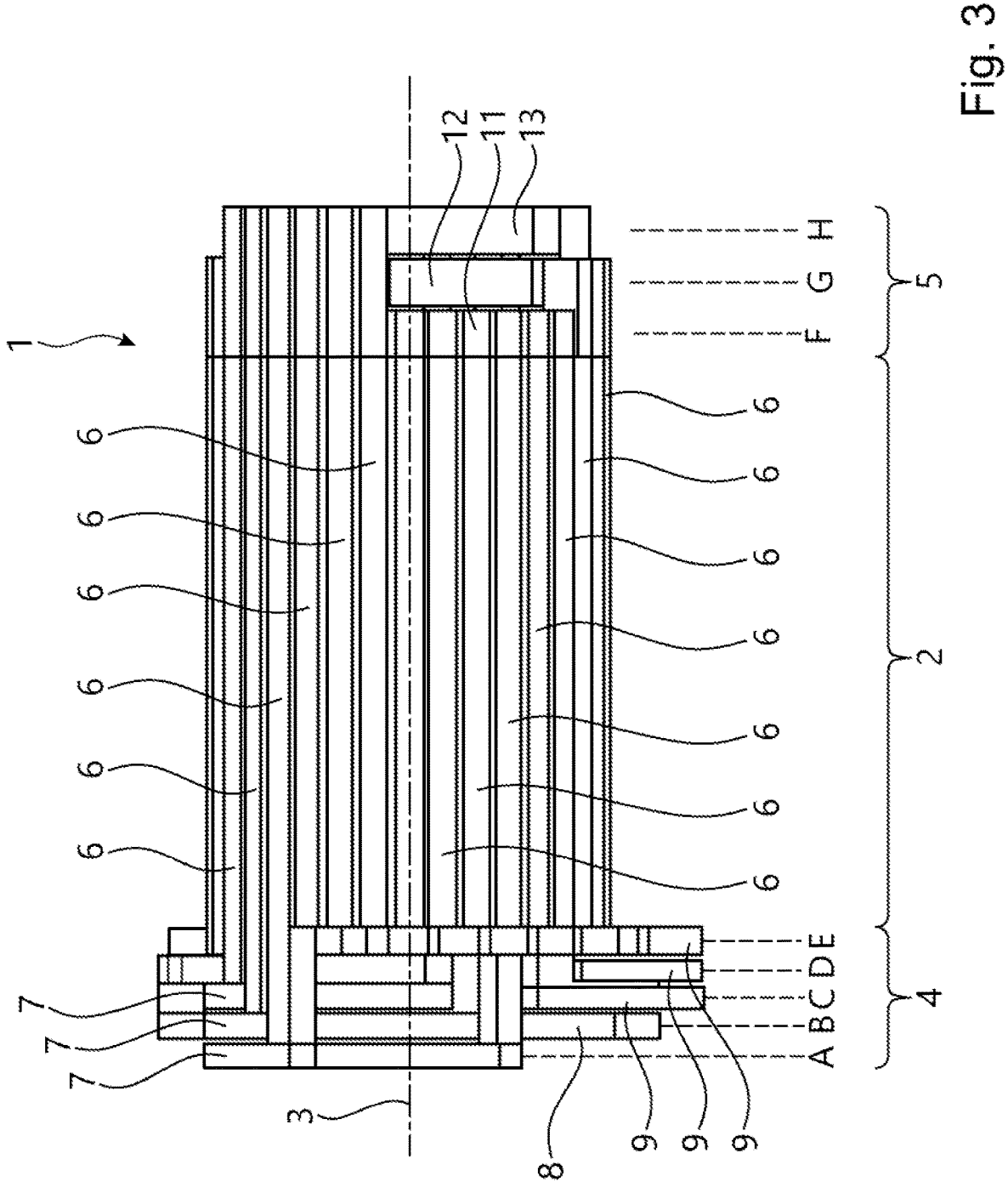

FIGS. 1 to 3 show a first schematic example of an air gap winding 1 according to the disclosure, which is merely intended to clarify the basic structure of an air gap winding according to the disclosure.

The air gap winding has a hollow cylindrical main section 2 in which a plurality of axial conductors 6 run parallel to the axis 3 of the air gap winding. The length of the main section 2 corresponds to the active length of the air gap winding. This is because the axial conductors 6 running in the main section 2 contribute to the formation of the torque of the electric machine. FIG. 1 shows that the axial conductors 6 in the main section 2 each have a cross-section, which is in the form of a circular ring sector, the outer and inner circular ring arcs of the circular ring sector preferably each extend- ing around a center point on the axis (3). At the two axial ends of the main section 2, the two winding heads 4 and 5 of the air gap winding can be seen. The winding head connections 7, 8, 9, 11, 12 and 13 run in these, via which two axial conductors are connected to each other in each case. The winding head connections are necessary, but generate only ohmic losses and do not contribute to torque genera- tion.

The two winding heads 4 and 5 project radially in different directions beyond the hollow cylindrical main section 2. The first winding head 4 protrudes radially out- ward, while the second winding head 5 protrudes radially inward. As shown in FIG. 3, the winding head connections 7, 8, 9, 11, 12 and 13 are arranged in several axially spaced planes. The first winding head 4 has the five planes A, B, C, D and E. The winding head connections 7, 8, and 9 of the first winding head thus run in five different planes and, as can be seen in particular from FIG. 1, also in three different radial planes or three different radial distances from the center. At this point, it should be noted that only half of all the winding head connections of the first winding head are shown for reasons of presentation and clarity. The second winding head has three planes F, G and H. The winding head connections 11, 12 and 13 of the second winding head thus run in three different planes and, as can be seen in particular from FIG. 2, also in three different radial planes. In general, the winding head connections on each of the two winding heads run along circular curves or circular arcs with three different radii, with the center of the circular curves or circular arcs lying on axis 3.

The air gap winding shown in FIGS. 1 to 3 has three phases. The winding head connections 7 and 13 and the axial conductors 6 running between them belong to the first phase, the winding head connections 8 and 12 and the axial conductors 6 running between them belong to the second phase, and the winding head connections 9 and 11 and the axial conductors 6 running between them belong to the third phase. At the first winding head 4, there is a radial offset between the winding head connections 7, 8 and 9 of the three different phases, whereas at the second winding head 5 there is an axial offset between the winding head connections 11, 12 and 13 of the three different phases. On the first winding head, the outer winding head connections 9 of the third phase run on circular curves with the largest radius and thus radially enclose the center winding head connections 8 of the second phase and the inner winding head connections 7 of the first phase. On the second winding head 5, on the other hand, the winding head connections of a single phase run concentrically on circular curves with three different radii.

Figure 4:
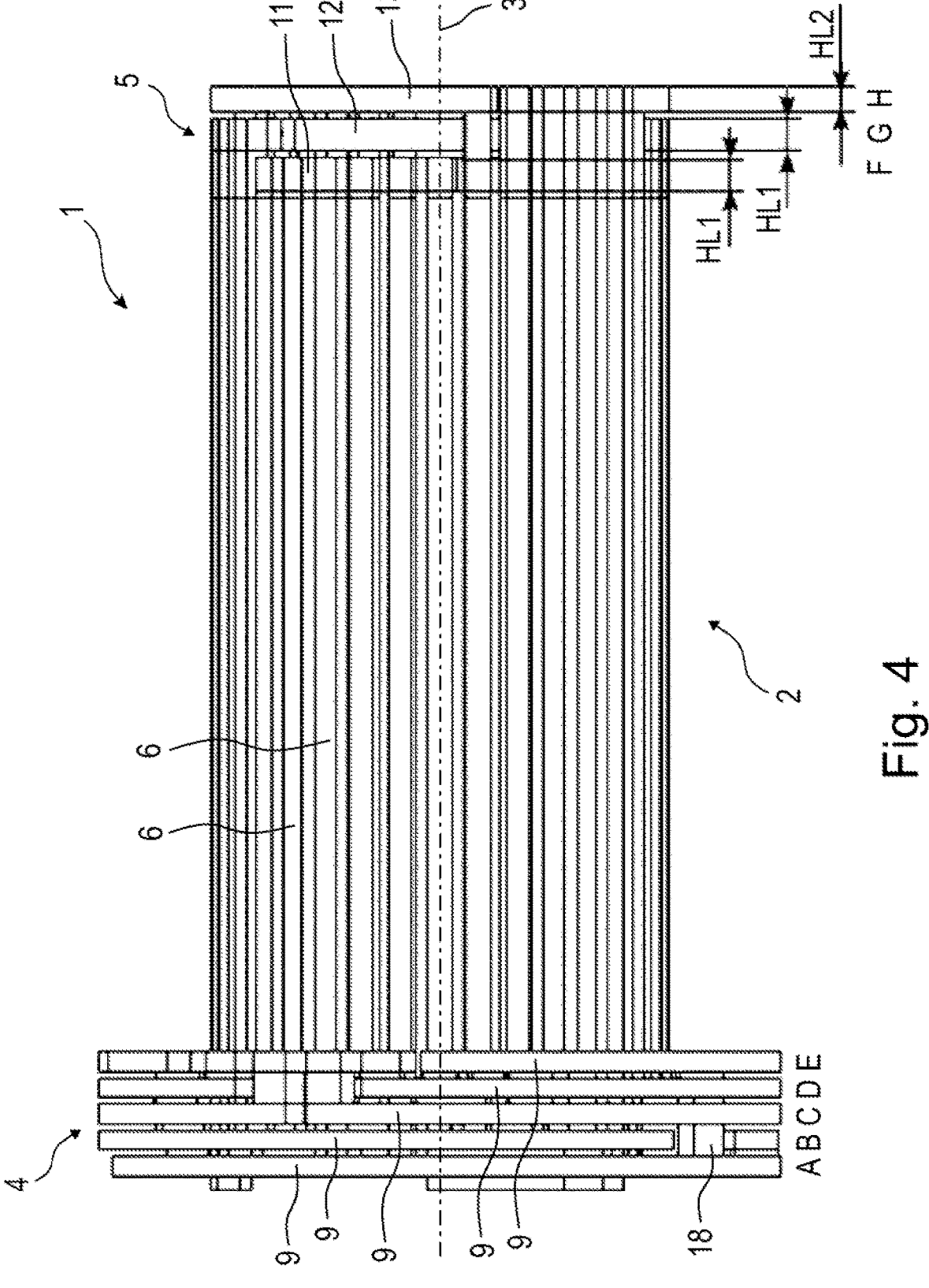
Figure 6:
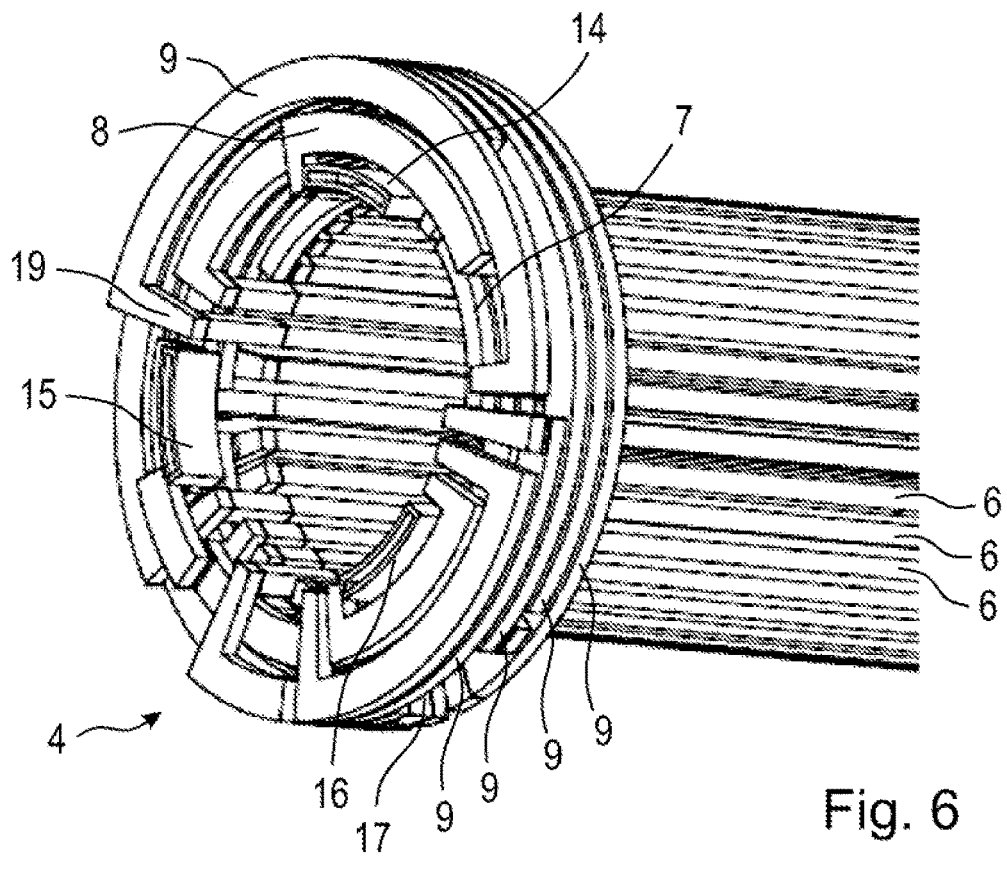
Figure 7:
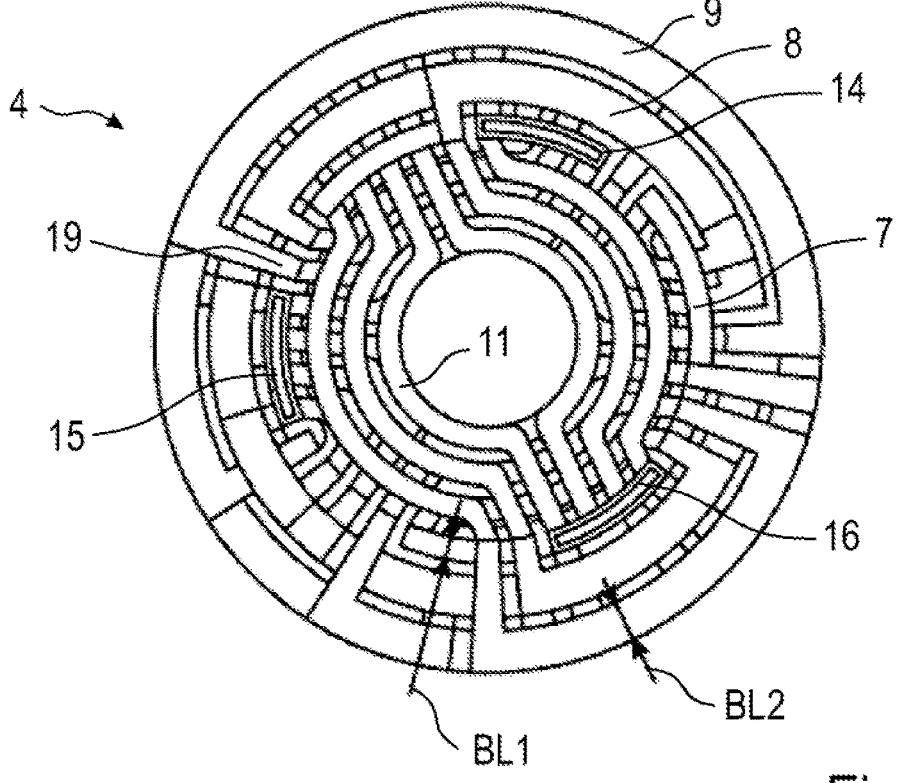

While FIGS. 1 to 3 show only a schematic example. FIGS. 4 to 17 show a concrete embodiment of an air gap winding according to the disclosure. Apart from the arrange- ment of the winding head conductors in the first winding head, the general structure is the same as the schematic example shown in FIGS. 1 to 3. However, additional struc- tures in the form of electrical conductors are provided at the first winding head, which serve to produce a star point. The arrangement of the winding head conductors on the first winding head 4 is therefore somewhat more complicated, so that a clear assignment of the winding head conductors to the three different phases cannot be made at first glance on the basis of FIGS. 4 to 9. However, the exact course of the winding head conductors can be traced on the basis of the cross-sectional diagrams in FIGS. 10 to 17. A legend to the hatching used in FIGS. 10 to 17 and to the symbols used can be found in FIG. 18. The first winding head 4 is shown in detail in FIGS. 6 and 7. From these two figures it can also be seen that three connections 14, 15 and 16 are provided for the three different phases. The connection can preferably be realized by a solder connection. For this purpose, the three terminals 14, 15 and 16 have recesses designed to receive the connecting lead and the solder. In FIGS. 4, 6 and 7, it can also be seen that the winding head 4 has various connecting pieces. For example, the axial connector 17 shown in FIG. 6 serves to connect planes 3 (C) and 5 (E) of the first winding head 4, while the axial connector 18 shown in FIG. 4 serves to connect planes 1 (A) and 3 (C). Also shown in FIG. 6 and in FIG. 7, for example, is a radial connector 19 through which the connection is made from one of the axial conductors 6 to the associated outer winding head connection 9. It should be noted that, strictly speaking, the connecting pieces belong to the winding head connections.

Figure 8:
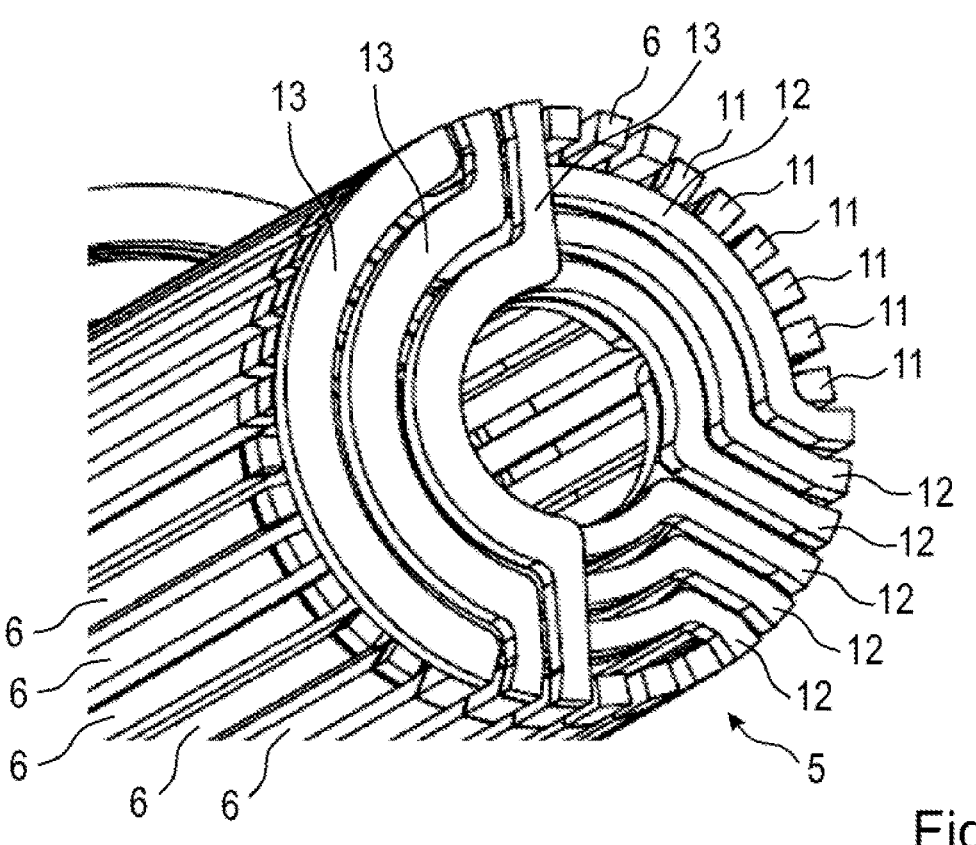
Figure 15:
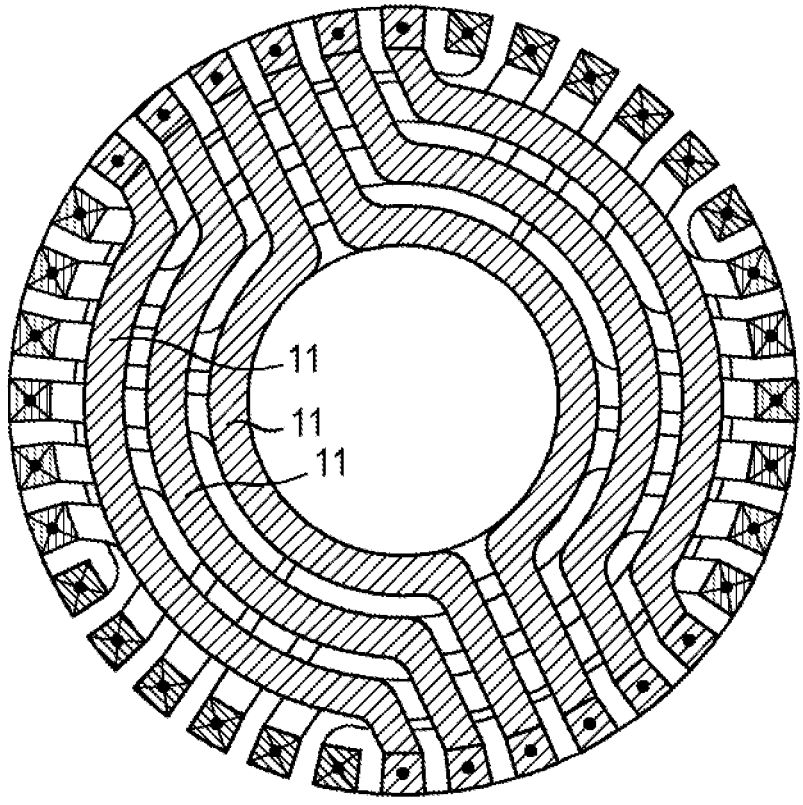
Figure 16:
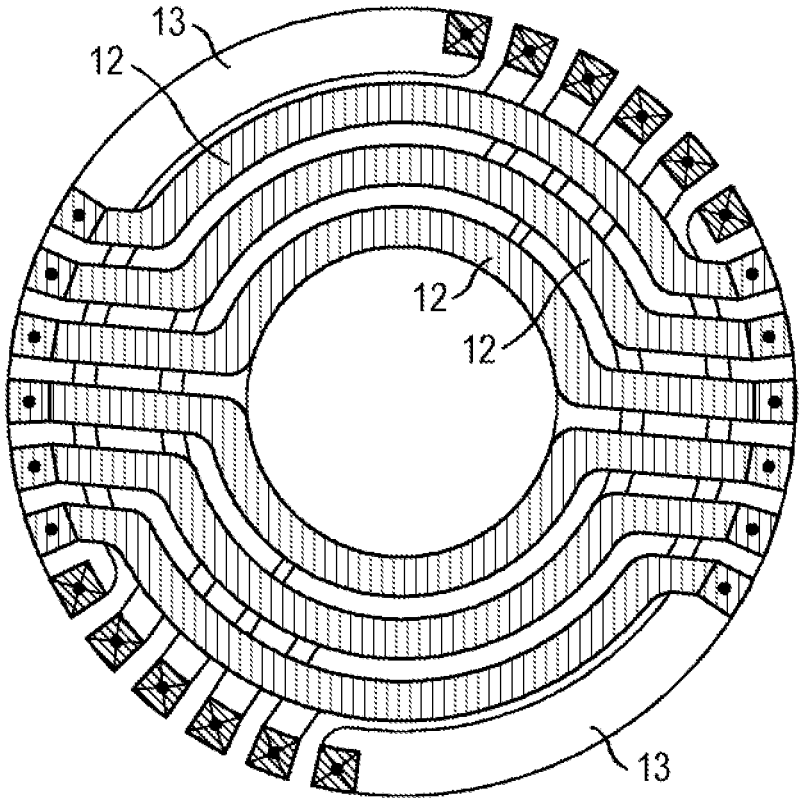
Figure 17:
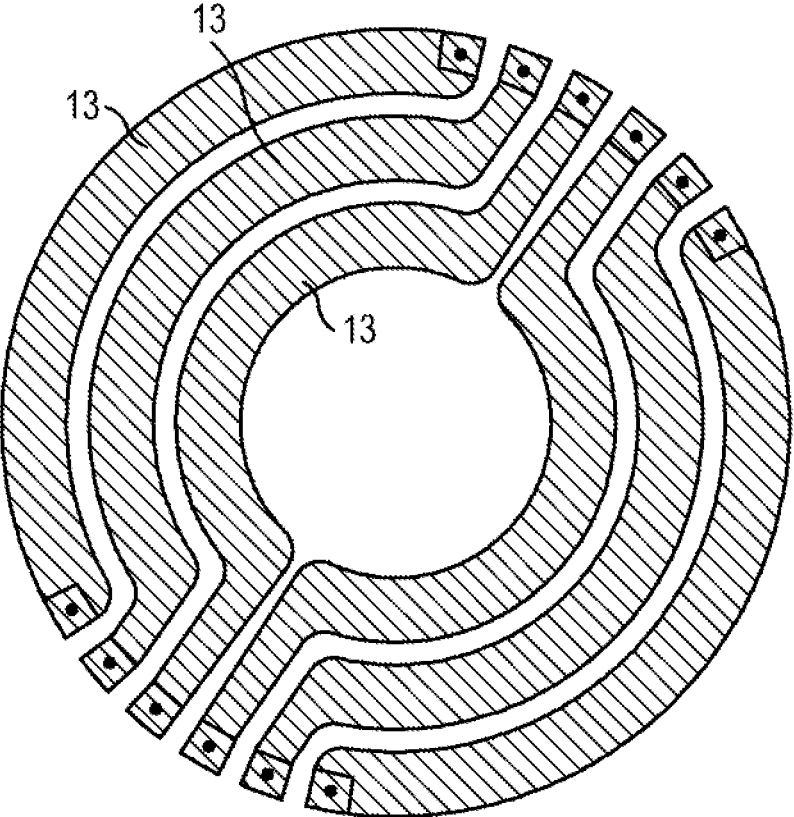

FIG. 8 shows a detailed perspective view of the second winding head of the air gap winding system of the disclosure shown in FIGS. 4 to 7. The axial conductors 6 form the main hollow-cylindrical section 2. On the second winding head 5, the winding head connections 11 of plane 1 (F) are shown. These are largely covered in the figure by the winding head connections 12 in plane 2 (G). The winding head connections 13 in plane 3 (H) are shown only in part so as not to completely cover the winding head connections below. The exact course of the winding head connections of the second winding head is shown in FIGS. 15 to 17.

Figure 9:
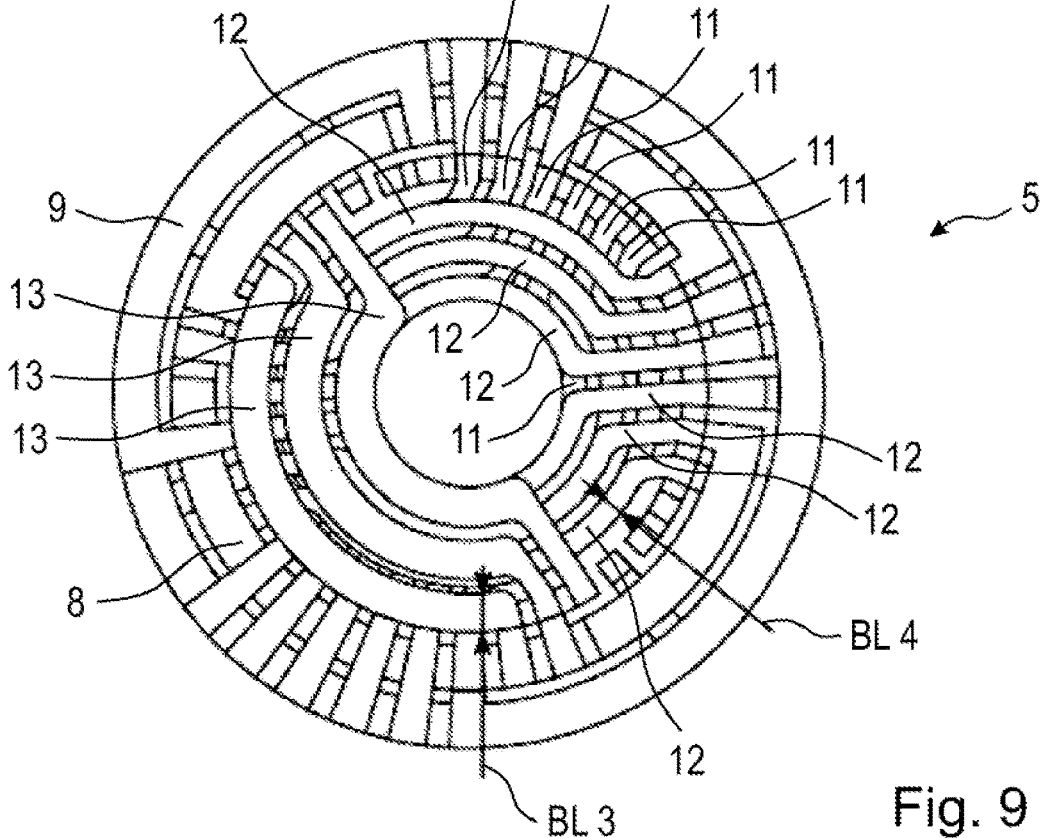

FIG. 9 shows a top view of the second winding head of the air gap winding according to the disclosure from FIGS. 4 to 8. In FIG. 9, the central winding head connections 8 of the first winding head and the outer winding head connections 9 of the first winding head, which are arranged at the opposite end of the air gap winding 1, are also visible. On the second winding head 5, the winding head connections 11 of plane 1 (F) as well as the winding head connections 12 in plane 2 (G) and the winding head connections 13 of plane 3 (H) are shown. The exact path of the winding head connections of the second winding head is shown in FIGS. 15 to 17. Also shown is the conductor width BL3 of the winding head connections in plane 3 (H) of the second winding head and the conductor width BL4 of the winding head connections in planes 1 (F) and 2 (G) of the second winding head.

FIGS. 8 and 9 show the second winding head of the air gap winding of FIGS. 4 to 7 according to the disclosure. The exact course of the winding head connections of the second winding head is shown in FIGS. 15 to 17.

Figure 10:
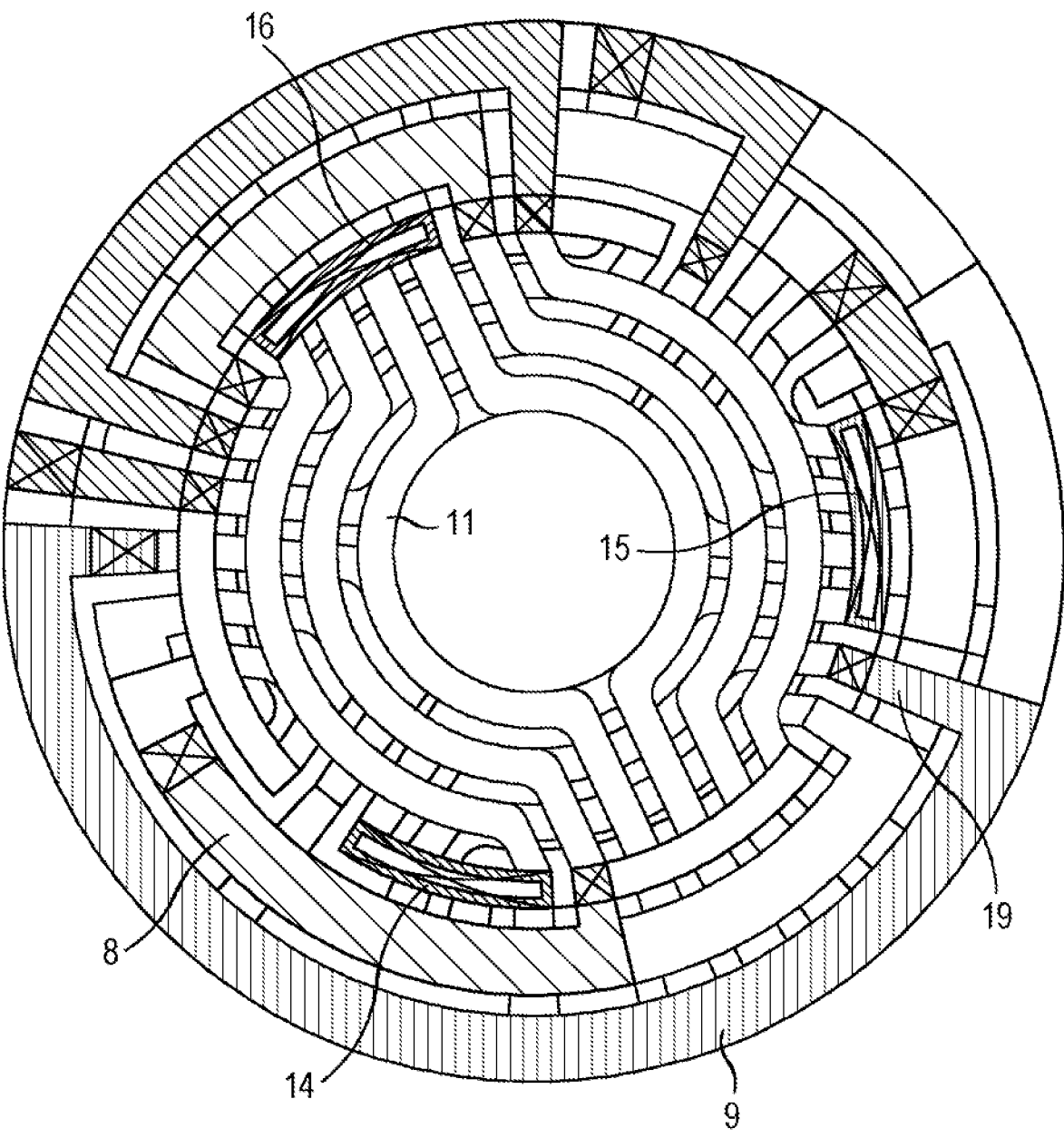

FIG. 10 shows a cross-section through the air gap winding of FIGS. 4 to 9 in plane 1 (A) of the first winding head. At the opposite end of the air gap winding 1, the second winding head 5 is shown with the winding head connections 11 of plane 1 (F). In the cross-section in the plane 1 (A) of the first winding head, the connection 14 of phase 1 is located, as well as the connection 15 of phase 2 and the connection 16 of phase 3. Further, radial connecting pieces 19 are shown between axial conductor 6 and outer winding head connection 9 of the first winding head. Furthermore, a middle winding head connection 8 and an outer winding head connection 9 of the first winding head are shown. The middle winding head connection marked with reference sign 8 represents an electrical connection between two phases according to the hatching, while the outer winding head connection marked with reference sign 9 represents an electrical connection of phase 2. In the plane 1 (A) of the first winding head, winding head connections of phases 1 and 2 run, as well as electrical connections between two phases.

Figure 11:
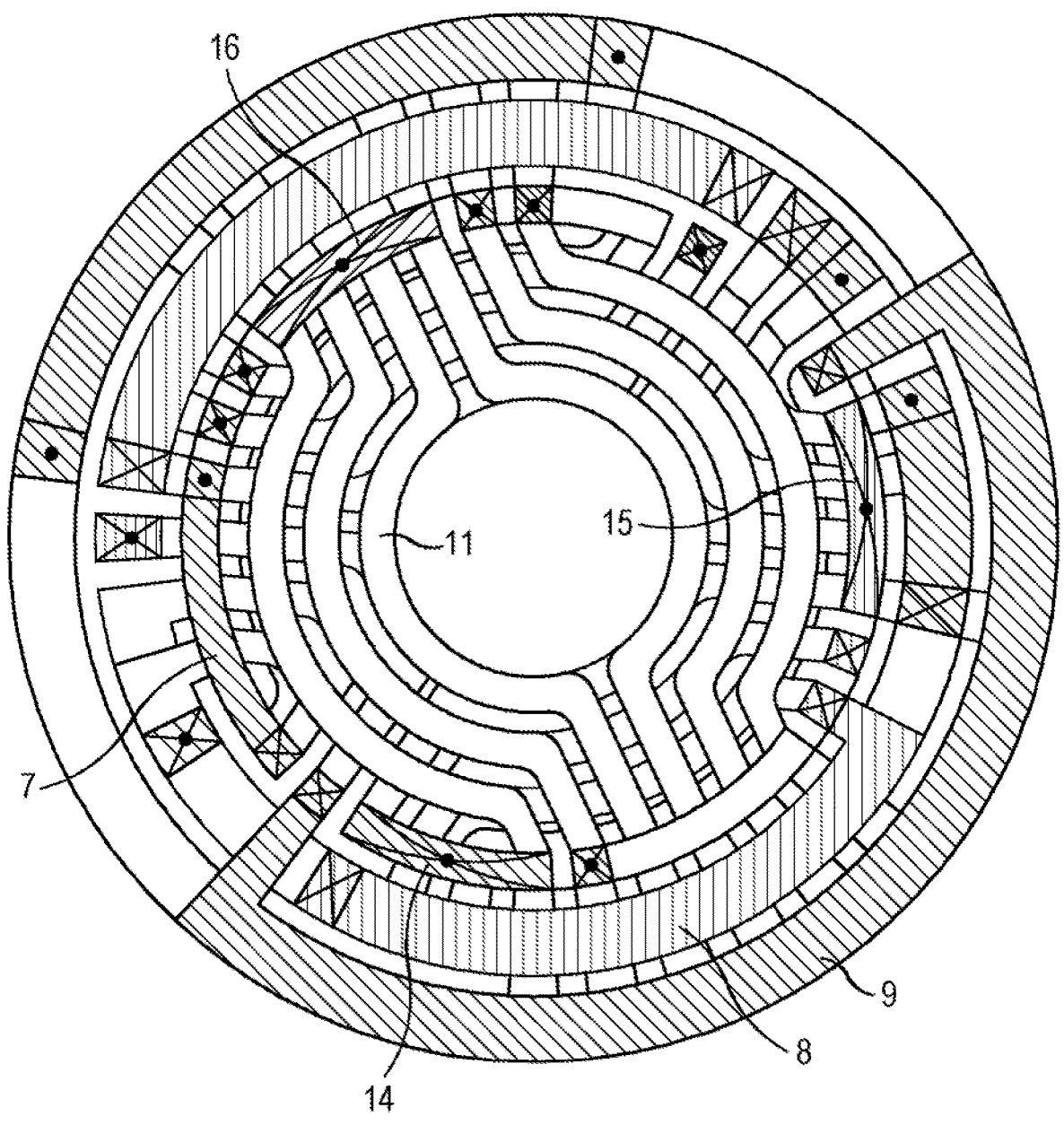

FIG. 11 shows a cross-section in plane 2 (B) of the first winding head. At the opposite end of the air gap winding 1, the second winding head 5 is again shown with the winding head connections 11 of plane 1 (F). In the cross-section in plane 2 (B) of the first winding head lies the connection 14 of phase 1, as well as the connection 15 of phase 2 and the connection 16 of phase 3. Furthermore, an inner winding head connection 7, a middle winding head connection 8 and an outer winding head connection 9 of the first winding head are shown. The inner and outer winding head connections marked with reference signs 7 and 9 represent an electrical connection of phase 1 according to hatching, while the middle winding head connection marked with reference sign 8 represents an electrical connection of phase 2 according to hatching.

Figure 12:
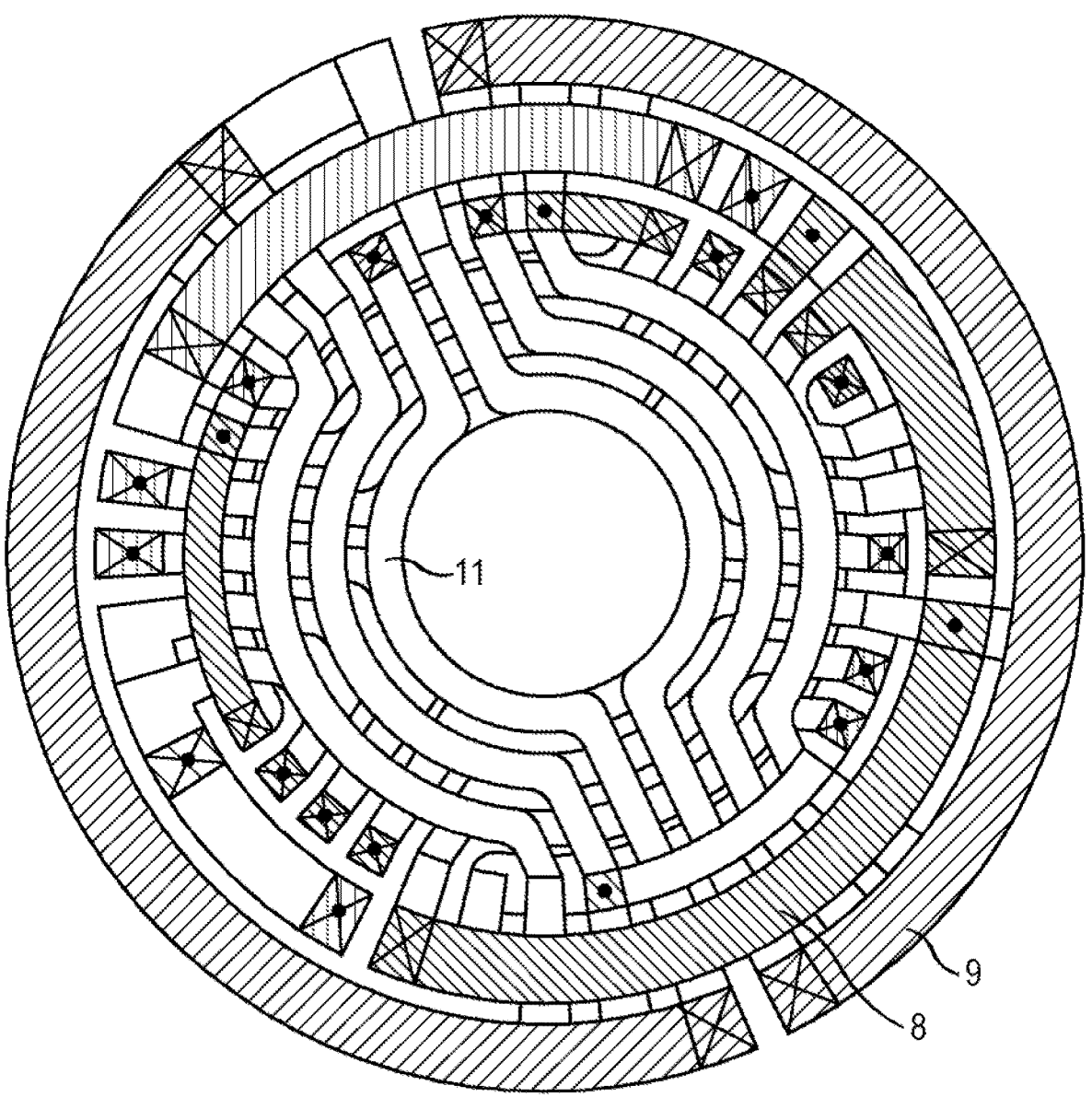

FIG. 12 shows a cross-section in plane 3 (C) of the first winding head. At the opposite end of the air gap winding 1, the second winding head 5 with the winding head connections 11 of plane 1 (F) is shown. According to the hatchings, winding head connections of all three phases run in plane 3 (C) of the first winding head. The middle winding head connection marked with reference line 8 represents an electrical connection of phase 1 according to the hatching, while the outer winding head connection marked with reference line 9 represents an electrical connection of phase 3 according to the hatching.

Figure 13:
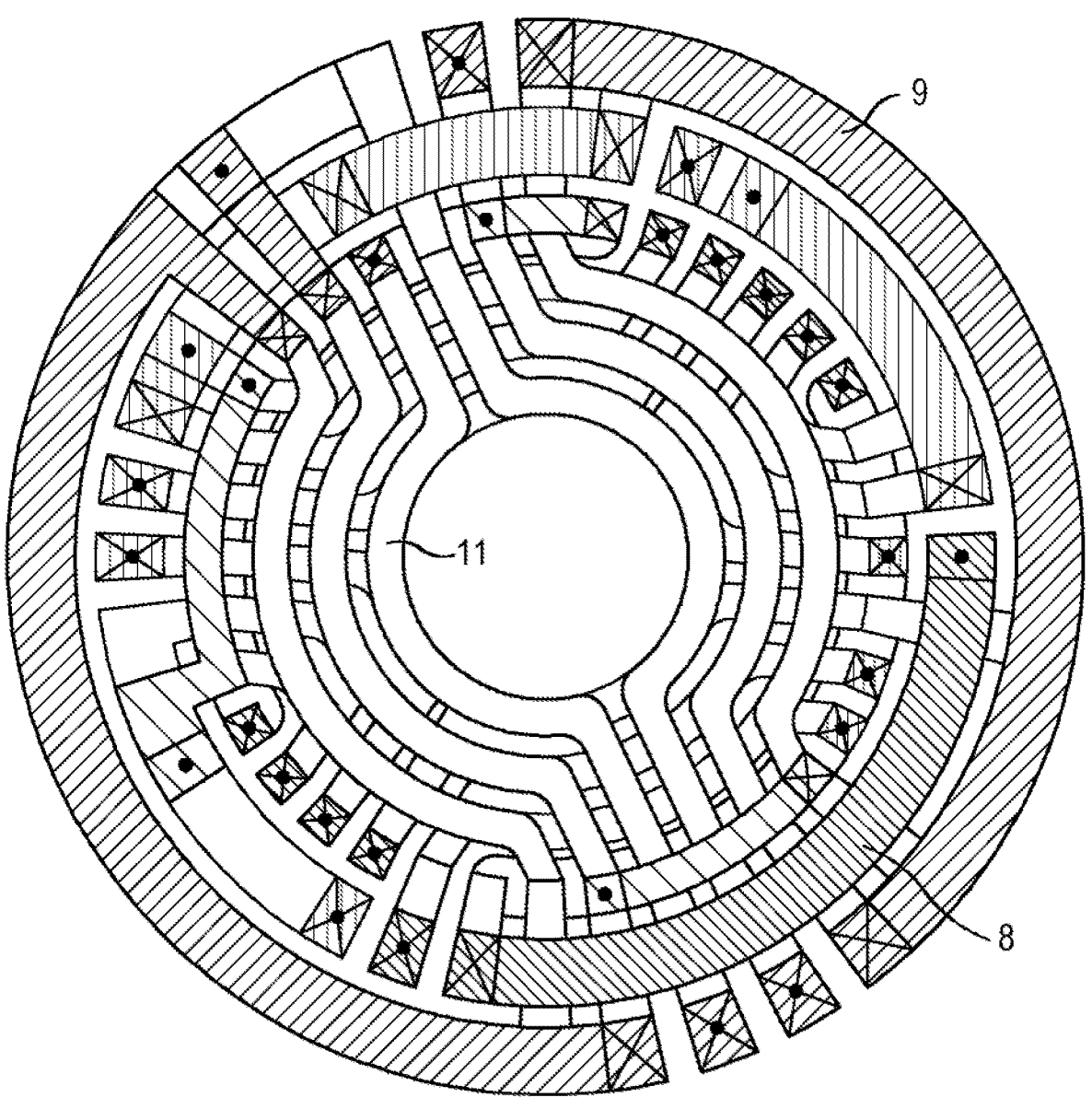

FIG. 13 shows a cross-section in plane 4 (D) of the first winding head. At the opposite end of the air gap winding 1, the second winding head 5 with the winding head connections 11 of plane 1 (F) is shown. According to the hatching, winding head connections of all three phases also run in plane 4 (D) of the first winding head. Furthermore, according to the hatching, electrical connections between the phases are arranged in plane 4 (D) of the first winding head.

Figure 14:
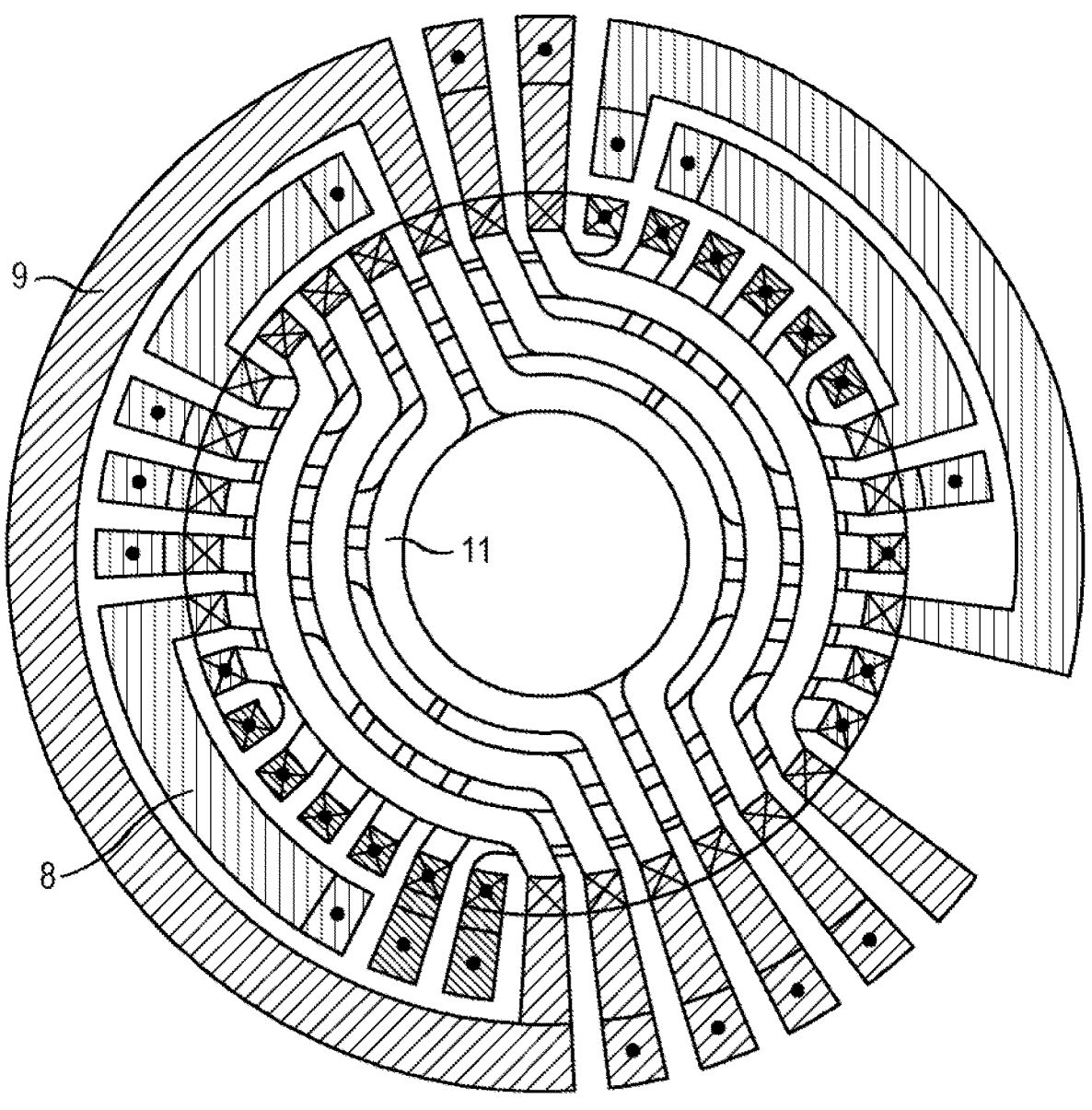

FIG. 14 shows a cross-section in plane 5 (E) of the first winding head of the air gap winding according to the disclosure. At the opposite end of the air gap winding 1, the second winding head 5 is again shown with the winding head connections 11 of plane 1 (F). According to the hatchings, winding head connections of phases 2 and 3 also run in plane 5 (E) of the first winding head. The middle winding head connection marked with reference sign 8 represents an electrical connection of phase 2 according to the hatching, while the outer winding head connection marked with reference sign 9 represents an electrical connection of phase 3 according to the hatching.

FIG. 15 shows a cross-section in plane 1 (F) of the second winding head of the air gap winding according to the disclosure. The winding head connections 11 run in plane 1 (F) of the second winding head. The winding head connections running in this plane are winding head connections of phase 3 according to the hatching.

FIG. 16 shows a cross-section in plane 2 (G) of the second winding head of the air gap winding according to the disclosure. The winding head connections 12 run in plane 2 (G) of the second winding head. Furthermore, the winding head connections 13 are shown in plane 3 of the second winding head. According to the hatching, winding head connections of phase 2 run in plane 2 (G).

FIG. 17 shows a cross-section in plane 3 (H) of the second winding head of the air gap winding according to the disclosure. The winding head connections 13 run in plane 3 (H) of the second winding head. The winding head connections running in this plane are winding head connections of phase 1 according to the hatching.

FIGS. 15 to 17 show that the winding head connections of each phase are arranged on an axial plane of the winding head. This results in an axial offset between different phases in the second winding head.

The air gap winding according to the disclosure is optimized with respect to the ohmic resistance of the winding head connections and the phase windings. The inner winding head connections 7 of the first winding head 4 have the conductor width BL1, which depends on the installation space limited by the outer diameter of the rotor and the inner diameter of the stator. The center and outer winding head connections 8 and 9 have conductor width BL2. This is larger than the conductor width BL1. Since the conductor height is the same for all winding head connections of the first winding head, the center and outer winding head connections have a larger cross-section compared to the inner winding head connections. This results in reduced ohmic resistance. This compensates for the greater length of the center and outer winding head connections. In addition, the overall resistance of a strand is reduced, which reduces ohmic losses and increases overall efficiency. Similarly, the winding head connections of the second winding head have different conductor widths BL3 and BL4 and also different conductor heights HL1 and HL2.

Figure 5:
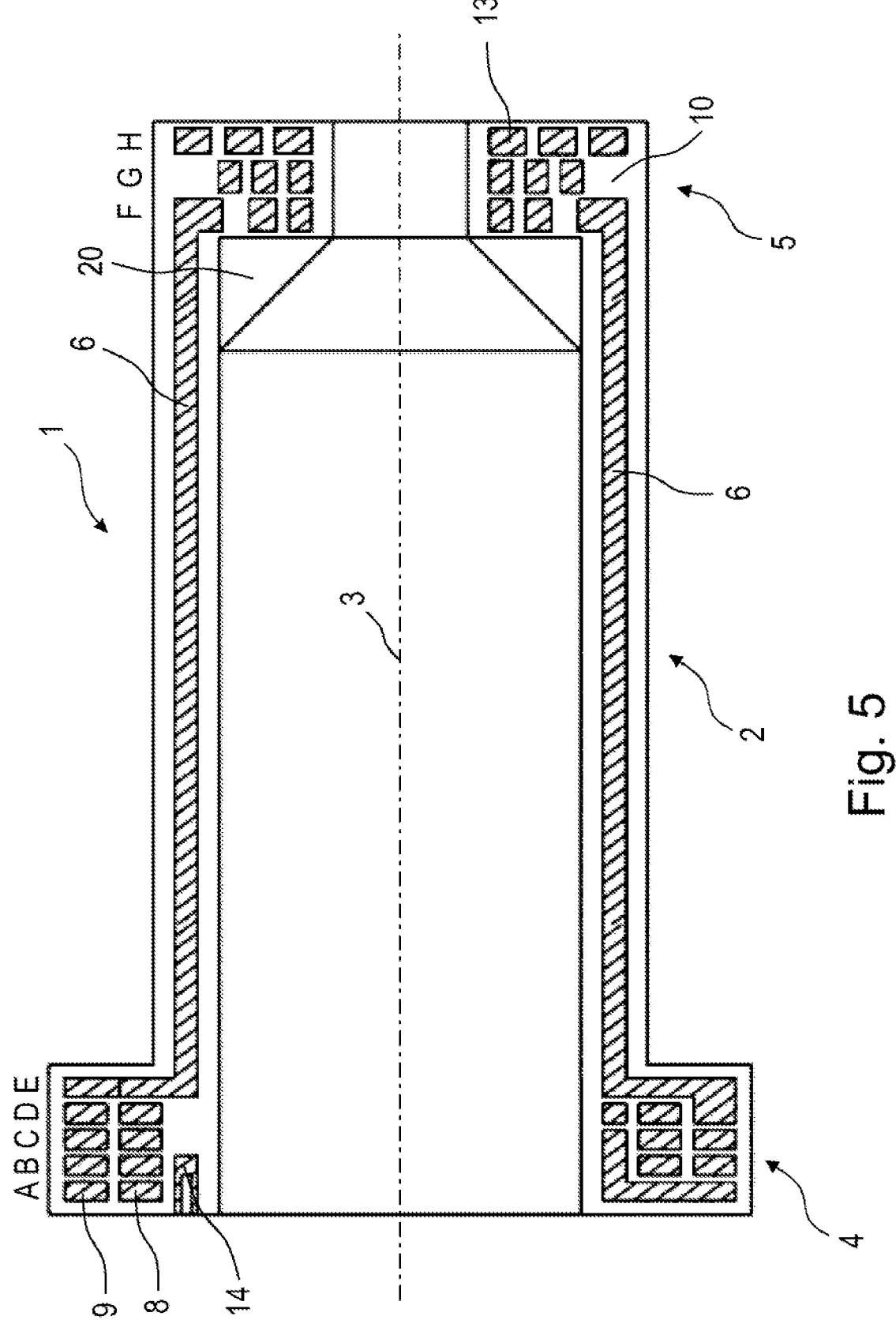

The longitudinal section in FIG. 5 shows that the winding conductors of the air gap winding are embedded in a ceramic insulation matrix 10. The ceramic insulation is not shown in the other figures for illustration and clarity. The hatching in this case merely serves to delimit the electrical conductors made of an electrically conductive material such as copper from the surrounding ceramic matrix. It does not establish any reference to a specific electrical phase or a connecting element between the phases. The inwardly projecting second winding head 5 is stabilized by a suitable support structure 20, which may also be made of ceramic.

FIG. 18 shows a legend of the hatchings and symbols used in FIGS. 10 to 17. The first three boxes show different hatchings for electrical connections of phases 1, 2 and 3. The fourth box shows a hatching for electrical connections between two phases. The fifth box shows a symbol for an axial connection out of the drawing plane to the previous winding plane or to an axial conductor. The sixth box shows a symbol for an axial connection into the drawing plane to the following winding plane or to an axial conductor. The seventh box shows a symbol for an axial connection both out of the drawing plane and into the drawing plane.

LIST OF REFERENCE SIGNS

1 Air gap winding
2 Main section
3 Axis
4 First winding head
5 Second winding head
6 Axial conductor
7 Inner winding head connection of the first winding head
8 Middle winding head connection of the first winding head
9 Outer winding head connection of the first winding head
10 Ceramic insulation

10

11 Winding head connection in plane 1 of the second winding head
12 Winding head connection in plane 2 of the second winding head
13 Winding head connection in plane 3 of the second winding head
14 Phase 1 connection
15 Phase 2 connection
16 Phase 3 connection
17 Axial connection piece between planes 3 and 5 of the first winding head
18 Axial connection piece between planes 1 and 3 of the first winding head
19 Radial connection piece between axial conductor and outer winding head connection of the first winding head
20 Support structure
A Plane 1 of the first winding head
B Plane 2 of the first winding head
C Plane 3 of the first winding head
D Plane 4 of the first winding head
E Plane 5 of the first winding head
F Plane 1 of the second winding head
G Plane 2 of the second winding head
H Plane 3 of the second winding head
HL1 Conductor height of winding head connections in plane 1 and 2 of the second winding head
HL2 Conductor height of winding head connections in plane 3 of the second winding head
BL1 Conductor width of the inner winding head connections of the first winding head
BL2 Conductor width of the center and outer winding head connections of the first winding head
BL3 Conductor width of the winding head connections in plane 3 of the second winding head
BL4 Conductor width of the winding head connections in plane 1 and 2 of the second winding head

What is claimed is:

1. An additively manufactured air gap winding for an electrical machine, comprising a hollow cylindrical main section having a geometric axis, the main section defining an active winding length of the air gap winding, electrical winding conductors of the air gap winding extending in the main section from a first axial end of the air gap winding to a second axial end of the air gap winding, and with a first winding head at the first axial end of the air gap winding and a second winding head at the second axial end of the air gap winding, wherein winding head connections of the winding conductor extend in the winding heads, wherein the winding heads project radially inwardly and/or outwardly beyond the hollow cylindrical main section, wherein at least two of the winding head connections extend at least in sections at different distances from the axis in such a way that one winding head connection radially surrounds the other winding head connection at least in sections.

2. The air gap winding according to claim 1, wherein the radially surrounding winding head connections run along circular curves with different radii.

3. The air gap winding according to claim 2, wherein the center of the circular curves lies on the axis.

4. The air gap winding according to claim 2, wherein the winding head connections in the first winding head run along circular curves whose radius is greater than or substantially equal to the mean radius of the hollow cylindrical main section, wherein the winding head connections in the second winding head run along circular curves whose radius is smaller than or substantially equal to the mean radius of the hollow cylindrical main section.

5. The air gap winding according to claim 1, wherein at least some of the winding head connections in the first and/or second winding heads run in different planes which are axially spaced apart from one another.

6. The air gap winding according to claim 5, wherein the different planes are aligned perpendicular to the axis.

7. The air gap winding according to claim 1, wherein the air gap winding has at least two phases, the winding head connections of one phase being axially or radially offset from the winding head connections of another phase.

8. The air gap winding according to claim 7, wherein there is an axial offset between the winding head connections of different phases at the second winding head, the second winding head projecting radially inwards beyond the hollow cylindrical main section.

9. The air gap winding according to claim 1, wherein the effective total length of all winding head connections of a single phase of the air gap winding is substantially the same for all phases of the air gap winding.

10. The air gap winding according to claim 9, wherein the conductor cross-sectional area of individual winding head connections varies among themselves and/or along an individual winding head connection.

11. The air gap winding according to claim 9, wherein that phase of the air gap winding which has the longest winding head connections at the first winding head simultaneously has the shortest winding head connections at the second winding head, wherein that phase of the air gap winding which has the shortest winding head connections at the first winding head has the longest winding head connections at the second winding head.

12. The air gap winding according to claim 1, wherein the winding conductors in the main section run parallel to the axis of the air gap winding.

13. The air gap winding according to claim 12, wherein the sections of the winding conductors running in the main section between the winding heads each have a cross-section which is in the form of a circular ring sector, the outer and inner circular ring arcs of the circular ring sector each running around a center point on the axis.

14. The air gap winding according to claim 1, wherein the winding conductors are made of one or more electrically conductive materials.

15. The air gap winding according to claim 1, wherein the winding conductors are surrounded by an insulation consisting of one or more insulating materials or are embedded in the insulation.

* * * * *